United States Patent

[11] 3,620,396

| [72] | Inventor | Duane R. Abfalter<br>Sonoma, Calif. |
|---|---|---|
| [21] | Appl. No. | 838,068 |
| [22] | Filed | July 1, 1969 |
| [45] | Patented | Nov. 16, 1971 |
| [73] | Assignee | Travel Accessories Manufacturing Company, Inc.<br>Orland, Calif. |

[54] SPARE TIRE CARRIER
14 Claims, 9 Drawing Figs.

| [52] | U.S. Cl. | 214/454 |
|---|---|---|
| [51] | Int. Cl. | B62d 43/00 |
| [50] | Field of Search | 214/450, 451, 452, 453, 454 |

[56] References Cited
UNITED STATES PATENTS

| 2,777,591 | 1/1957 | Manzatuik | 214/451 |
|---|---|---|---|
| 3,348,713 | 10/1967 | Will | 214/450 |
| 3,435,971 | 4/1969 | Powell | 214/451 |
| 3,494,493 | 2/1970 | Fowler | 214/454 |
| 3,223,263 | 12/1965 | Fielding | 214/454 |
| 3,330,431 | 7/1967 | Knecht | 214/454 |

*Primary Examiner*—Robert G. Sheridan
*Assistant Examiner*—John Mannix
*Attorney*—Boyken, Mohler, Foster & Schwab ABSTRACT: A carrier device for retaining a spare tire between body frame members of a truck which is movable and extendable to facilitate quick and easy removal of a tire from and return to its stowed position thereon. The device comprises an elongated extendable unit pivotally connected to one truck frame member at one end and releasably connected to the truck body at the other end. The tire is attached to an upper member of the unit so that, when released, it can be moved from its stowed position while supported by a lower member of the unit.

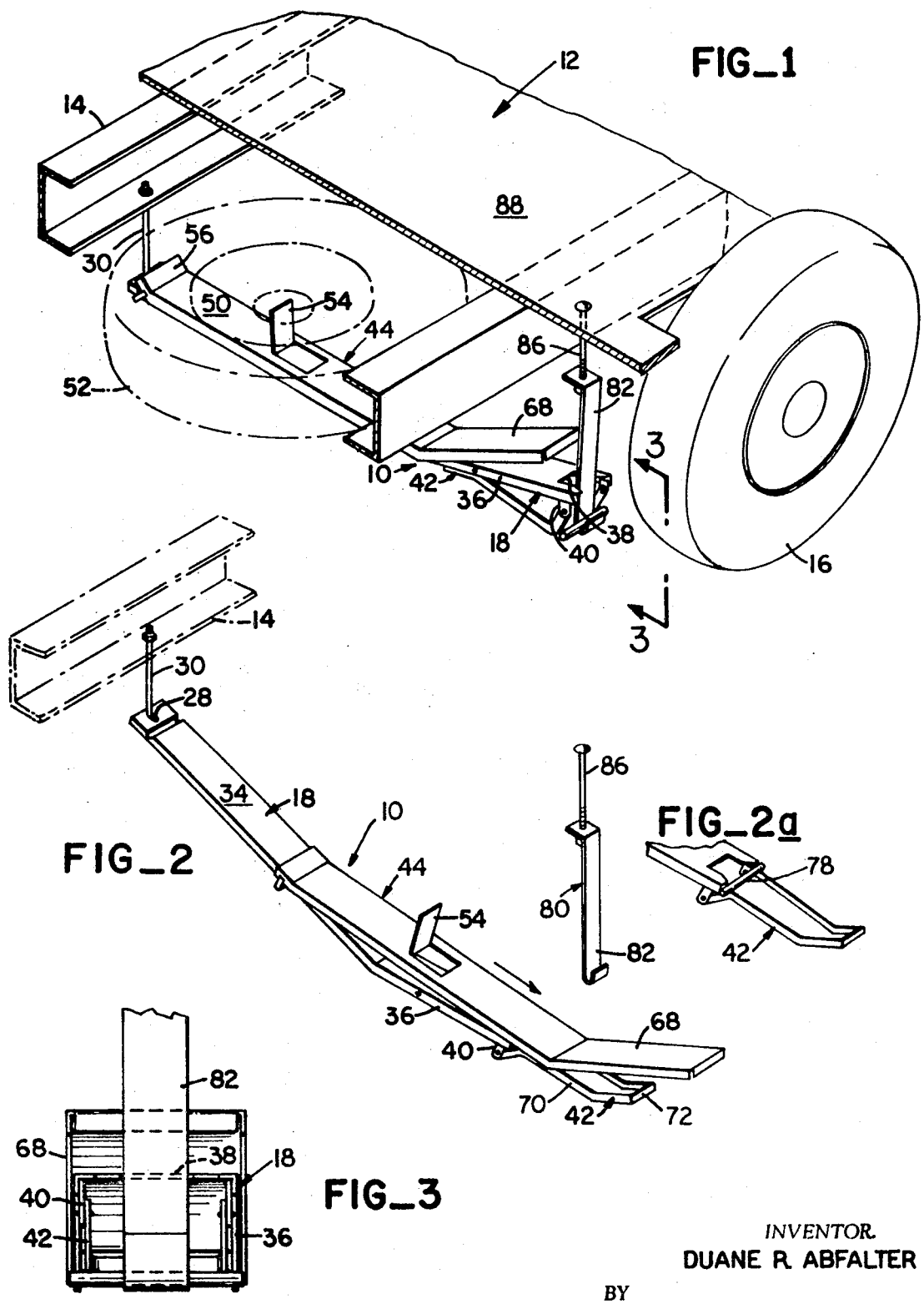

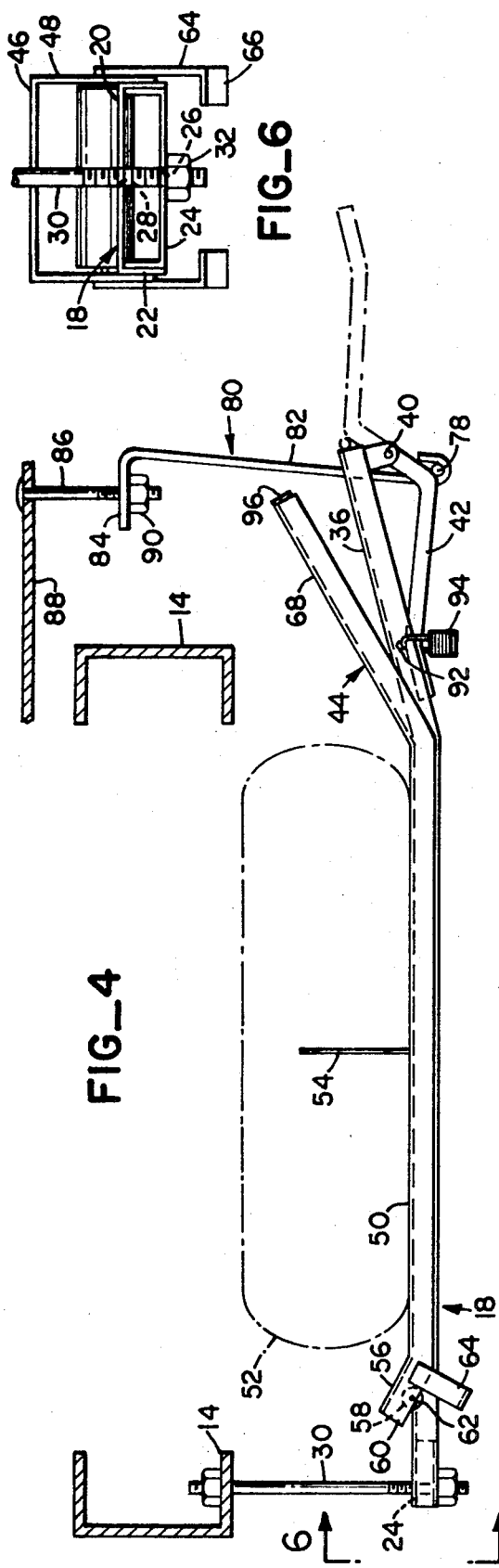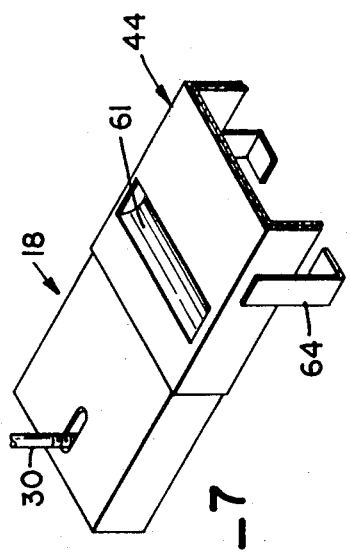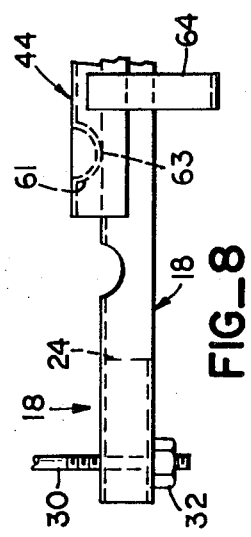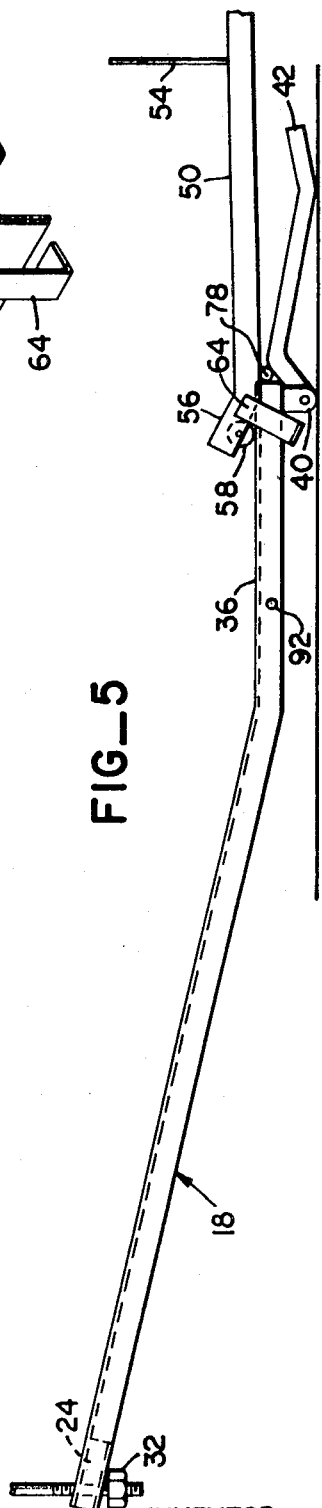

SPARE TIRE CARRIER

This invention relates to an improved carrier or stowage device for spare tires on trucks.

On conventional trucks, particularly those commonly referred to as "pickup" or "camper" trucks, the spare tire heretofore was usually stored on a crossmember supported at its ends by the two main body frame members. When it became necessary to use the spare tire, one end of the crossmember was released by removing a bolt and allowing it to drop down. It then became necessary to remove the tire from the crossmember, a task that often became extremely difficult because of the combination of the tire weight plus the relative inaccessibility of the crossmember and lack of working space under the truck. In fact, prior to the present invention the removal and replacement of spare tires on conventional trucks of the aforesaid type was not only difficult, laborious and time consuming, but under certain conditions and for some persons it was an impossible task.

It is, therefore, an object of this invention to provide an improved carrier device for stowing a spare tire on vehicles such as small trucks, and more particularly a device that will facilitate the removal and restowing of a spare tire without the time-consuming physical exertion and inconvenience heretofore required with prior art devices.

Another object of the present invention is to provide a spare tire carrier that can be released easily without reaching under the truck and which when released, will function to move the tire outwardly from under the truck, thereby making it accessible and obviating the necessity to maneuver the tire manually in a confined space beneath the truck.

Another object of the present invention is to provide a spare tire carrier that will facilitate the removal of the tire from either the side or from the rear of the truck whichever is most convenient.

Another object of the present invention is to provide a spare tire carrier that is adaptable for installation on conventional trucks without requiring extensive modifications to the truck.

Another object of the present invention is to provide a spare tire carrier that is particularly well adapted for ease and economy of manufacture.

In broad terms, my tire carrier device is an extendable unit which is pivotally connected at one end to one frame of the truck and which is adapted to be releasably latched at the other end to the truck body on its opposite side when the tire is in the stowed position. The extendable unit is comprised of a lower member and an upper member that is movable on and supported by the lower member. The lower member is shaped so that it guides the upper member which holds the tire during its extending and retracting movements. The upper and lower members are constructed so that the resistance to their relative movement is minimized, thereby allowing the relatively heavy tire to be manipulated easily by a small amount of effort. The lower member is pivotally attached to the truck so that it can be moved to any desired position when the tire is removed. At its other end the extensible unit is provided with a pivotal latching handle member that cooperates with a bracket on the truck body to hold the carrier device and a spare tire thereon firmly locked in the stowed position.

Other objects, advantages and features of my invention will become apparent from the following detailed description thereof presented in conjunction with the accompanying drawings, in which:

FIG. 1 is a view in perspective showing a tire carrier embodying the principles of the present invention in its stowed position on a truck;

FIG. 2 is a view in perspective showing the tire carrier of FIG. 1 in the released position with the upper member partially extended on the lower member;

FIG. 2a is a fragmentary view in perspective of the lower member with the handle extended;

FIG. 3 is an enlarged end view of the tire carrier taken along the line 3—3 of FIG. 1;

FIG. 4 is a view in elevation of the tire carrier shown in FIG. 1 taken from the rear end of the truck and showing the handle in an alternate position in phantom;

FIG. 5 is a fragmentary view in elevation showing the lower member released in the down position and the upper member fully extended;

FIG. 6 is an end view of the tire carrier taken along the line 6—6 of FIG. 4;

FIG. 7 is an enlarged fragmentary view in perspective showing an alternate construction for the inner end of the upper member; and FIG. 8 is a view in elevation of the embodiment of FIG. 7 showing the inner end of the upper member removed from the notch of the lower member.

Referring to the drawing, FIG. 1 shows a spare tire carrier 10 embodying the principles of the present invention as it appears in the stowed position on a vehicle 12 such as a pickup truck. A typical truck frame is represented by a pair of parallel, spaced-apart channel members 14. To conserve space, only those portions of the frame members that extend rearwardly from the rear wheels 16 of a typical truck are shown, since this location on the truck is the one most adaptable for the installation of my tire carrier.

The carrier 10 is comprised of an elongated lower member 18 that is made of a suitable metal so that it is rigid and strong. Preferably, it is formed from sheet steel e.g., 14 gauge) with a channel-shaped cross section having a web portion 20 and downwardly extending side flanges 22. At one end the lower member, as seen in FIG. 5, is reinforced by a short piece of narrower channel member 24 whose flanges fit inside and are secured to the flanges 22 as by welding. This latter short member has a centrally located hole 26 which is vertically aligned with a slot 28 in the web 20 of the lower member 18. A bolt 30 secured to one of the truck frame members 14 and hanging downwardly from its lower flange, as shown in FIG. 2, extends through the slot 28 and the hole 26 and is retained by a nut 32 at its lower end. This latter arrangement affords a connection between the lower member 18 of my carrier and the truck frame 14 which allows the lower member to rotate downwardly as well as pivot horizontally.

The lower member 18 has a main planar portion 34 having a length approximately equal to the distance between the truck frame members 14. At the end of the lower member opposite from its pivotally connected end is a shorter, upswept portion 36 that is integral with and extends upwardly from the main portion at an angle of around 15°. At the outer end of this upswept portion, the web 20 is cutout to form a slot 38 that has an inner portion having a constant width and an outer portion that diverges to a greater width. Extending downwardly from the web portions of the upswept portion 36 on opposite sides of the slot are a pair of bearing supports 40. These bearing supports have aligned holes to facilitate a pivotal pin connection with a handle member 42, the details of which will be described later.

Mounted on top of and movable with respect to the lower member is an elongated upper member 44 which is also made of a strong, durable material such as sheet steel. It also has a channel-shaped cross section with a web portion 46 that is somewhat wider than the web portion 20 of the lower member 18 and downwardly extending flanges 48 that are spaced slightly outwardly from the side flanges 22 of the lower member. The upper member has a central planar portion 50 which is slightly shorter than the central portion of the lower member and yet somewhat longer than the diameter of a standard truck tire 52 (shown in phantom in FIG. 1). Approximately in the middle of this central portion is an upwardly extending flap 54 which extends through the center of a tire and serves to hold the tire in place on the carrier 10. At the inner or head end of the upper member is a relatively short, integral portion 56 that is swept up at an angle of around 20° to 30° from the central portion 50 and supports a roller 58 that is journaled in the opposite side flanges 60 of the portion 56. When the carrier 10 is in the stowed position with the upper member 44 fully retracted, the roller is seated in a notch 62 in the lower member 18 located near its pivotal connection to the truck frame. This essentially allows the lower member 18 to nest within the upper member 44 in the stowed position.

The latter notch is formed by a cutout portion that extends through the web and opposite flange portions of the lower member, as shown in FIG. 2.

In lieu of the rotatable roller 58, I may utilize a nonrotatable structure as shown in FIGS. 7 and 8. In this arrangement, I eliminate the upswept portion 56 on the upper member 44 and spaced from its end is provided a transverse downwardly extending protuberance 61 having approximately the same radius of curvature in cross section as the slot 62. This protuberance may be formed by first punching a pair of slots on opposite sides of the web portion of the upper member and thereafter forming the protuberance with a suitable die in a press. The lower surface of the protuberance may be provided with a layer or coating of some friction reducing material 63 such as polytetrafluorethylene resin. As with the roller 58, the protuberance remains in the notch 62 when the upper member is in the stowed position, but when the tire is being removed from or replaced into the stowed position, as shown in FIG. 2, the roller 58 (or protuberance 61) is moved out of the notch 62 and provides an end contact point and support for the upper member 44 on the lower member 18. The friction reducing material 63, as shown in FIG. 8, allows the upper member to be moved easily along the lower member.

Extending from the flanges of the upper member near its inner end are a pair of guide members 64. Each guide member extends below the lower member and has a lower end portion 66 that bends inwardly under the lower member, thereby serving to retain the upper member on the lower member as it is extended and retracted. At its other end the upper member has a longer upswept portion 68 that extends upwardly from the lane of the central portion 50. As shown in FIG. 4, the angle of this latter upswept portion 68 of the upper member is somewhat greater (e.g., 30°) than the angle of the upswept portion 36 of the lower member 18, and it is also somewhat shorter.

The handle 42 is also made of a suitable rigid material and has generally a U-shape in plan view with side portions 70 that are spaced apart so that they can fit between the flanges of the lower member 18, and these side portions are connected at one end by a gripping portion 22. In effect, the handle 42 is also a latching member and both side portions are similarly curved or bent to form relatively short portions at one end which are pivotally connected to the supports 40 extending downwardly from the lower member. Integral with and extending at an angle from the short portions of the handle are longer portions that are also slightly curved in the opposite direction near the gripping end portion 72. Fixed to the handle near the junction of its long and short portions is a cross pin 78. When the handle member is rotated outwardly, the cross pin 78 bears against the end of the lower member 18 across the slot 38, as shown in FIG. 2a and is adapted to seat within a hook member 80 so as to lock the tire carrier in its stowed position. As shown in FIG. 4, the hood member has a substantially vertical shank portion 82 of a uniform width that extends downwardly and slightly outwardly from a horizontal portion 84. The latter is attached to the end of a bolt 86 that may be conveniently secured to a suitable part of the truck structure. Obviously, the hook member may be attached to the truck in various ways depending on the type of truck on which the carrier is installed. Preferably, the bolt 86 is secured to the truck structure such as the floor 88 (as shown in FIG. 1) so that its lower end portion extends downwardly and retains the hook member. A nut 90 on the lower end of the bolt 86 can be adjusted to move the hook member up or down so that its lower end is visible just below the truck rear fender or body.

In operation, with a tire 52 in place around the upright positioning flap 54 of the upper member 44, the carrier 10 is held firmly in place by the latch handle 42. With the cross pin 78 of the latch handle seated in the lower end of the hook member 80, the long portion of the handle is rotated under and stowed beneath the upswept portion 36 of the lower member. In this locked or latched position, as shown in FIGS. 1 and 4, the vertical shank portion 82 of the hook member fits within the inner portion of the slot 38 to prevent any side sway of the carrier device. The cross pin also causes the shank portion of the hook member 80 to be deflected inwardly somewhat against its normal tendency to spring outwardly. Thus, as the latch handle is moved to the closed position, a reactive force is created by the hook member, but die to the shape of the latch handle 42 the aforesaid force merely urges the handle more tightly into the locked position, and this eliminates any tendency for the handle to come loose or unlock due to vibration. To prevent theft of the spare tire, a hole 92 is provided in one flange of the lower member directly above the handle member 42 so that a padlock 94 or the like can be inserted to lock it in place, as shown in FIG. 4. When it becomes necessary to use the spare tire, the latch handle 42 is released merely by reaching under the end of the lower member 18 and pulling its curved end downwardly. This releases the cross pin 78 from the hook member 80, and the carrier is now free at one end and can be lowered to the ground by the handle. At the same time the carrier can also be pivoted horizontally in case it is more convenient to retrieve the tire at the end or at the side of the truck. When the carrier is lowered to the ground the upswept end portion 36 of the lower member rests on the supports 40 and lies substantially parallel to the ground, the main portion of the lower member being at an incline. Now, the outer end of the upper member 44 is easily accessible and may be grasped as by a transverse flange 96 at the end of its upswept portion 68. A slight pull or tug will cause the roller 58 at the inner end of the upper member to ride up and out of the retaining notch 62 and onto the web portion 20 of the lower member 18. By the force of gravity the upper member 44 with the tire on it will move down the inclined lower member 18 and outwardly, as shown in FIG. 2. The guide members 64 keep the upper member aligned with the lower member during their relative movement and the supports 40 keep the upswept portion 36 far enough off the ground so that the guide members have sufficient clearance. When the upper member 44 is fully extended, the guide members 64 bear against the bearing supports 40 and serve as stops, as shown in FIG. 5. Now, the tire is easily accessible and can be removed from the upper member for use. When another tire is placed on the upper member, the carrier can be stowed easily by merely reversing the aforesaid procedure. The upper member is lifted by its outer end and pushed up the inclined lower member until the roller 58 has dropped into place within the notch 62. Now, the latch handle 42 is grasped to swing the carrier into position so that the latch pin 78 will fit into the hood member. When this is accomplished, the handle 42 is rotated downwardly and under the lower member 18 into its stowed and locked position.

From the foregoing it will be seen that the present invention provides a tire carrier for trucks and other vehicles that completely eliminates the problems of prior art devices with respect to the removal and restowing of a tire. With my carrier, the tire may be moved outwardly from under the truck to any convenient location adjacent it without requiring anyone to wrestle with the tire underneath the truck. The replacement of the tire and carrier to its stowed position is easily accomplished by one person with only a small amount of force required. When stowed, the carrier is securely latched in place, and yet it can be quickly and easily released when necessary. The unique construction of my carrier enables it to be readily manufactured in quantity at low cost, and it is adaptable for installation on a wide variety of vehicles, particularly pickup-type trucks.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A spare tire carrier adapted for installation on the underside of a wheeled vehicle comprising:

a. an elongated, longitudinally extensible unit extending in stowed position generally transversely of said vehicle;
b. means for connecting said unit at one end to said vehicle for generally horizontal pivoting of and lowering the other end of said unit; and
c. means at the other end of the unit for releasably connecting it to said vehicle when said unit is in a stowed position, said unit including:
d. an elongated lower member having a main planar portion one end of which is adapted to be operatively associated with said means for connecting said unit at one end for generally horizontal pivoting of and lowering the other end of said unit and an upswept portion extending from the other end of the main planar portion;
e. an elongated upper member longitudinally movable on and supported by said lower member, said upper member having a central portion with a planar surface and an upswept portion extending from the end of said central planar portion nearest said other end of the unit; and
f. means on said central portion for retaining a tire.

2. A carrier as described in claim 1 including:
g. means connected to said upper member for moving said upper member longitudinally along said lower member with a minimum of friction; and
h. means in said lower member for retaining said means for moving said upper member along said lower member when the carrier is in a stowed position.

3. A carrier as described in claim 2 wherein said means for moving said upper member along said lower member includes:
i. a roller supported at its ends in a position transverse to the longitudinal axis of said upper member.

4. A carrier as described in claim 2 wherein said means for moving said upper member along said lower member includes:
i. integral transverse and downwardly extending protuberance having a curved surface; and
j. a layer of friction reducing material on said curved surface.

5. A carrier as described in claim 1 wherein:
g. said upper and lower members each have a channel-shaped cross section; and
h. said lower member is narrower than and rests inside said upper member when said carrier is in a stowed position.

6. A spare tire carrier adapted for installation on the underside of a wheeled vehicle, comprising:
a. an elongated, longitudinally extensible unit extending, in stowed position, generally transversely of said vehicle;
b. means for connecting said unit at one end to said vehicle for generally horizontal pivoting of and lowering the other end of the unit;
c. means at the other end of said unit for releasably connecting it to said vehicle when said unit is in a stowed position said means including a hook supported on said underside; a handle pivotally connected to the other end of the unit; and hook-engaging means attached to said handle which is retained by said hood when the carrier is in a stowed position and which, by pivoting said handle is moved out of retention by said hood; and
d. means on said unit for retaining a tire intermediate said ends.

7. A spare tire carrier adapted for installation on the underside of a wheeled vehicle comprising:
a. an elongated longitudinally extensible unit extending in stowed position generally transversely of said vehicle, said unit including an elongated lower member, and an elongated upper member longitudinally movable on and supported by said lower member:
b. means for connecting said unit at one end to said vehicle for general horizontal pivoting of and lowering the other end of the unit;
c. means at the other end of said unit for releasably connecting it to said vehicle when said unit is in a stowed position said means including a hook supported on said underside; a handle pivotally connected to the other end of the unit; and hook-engaging means attached to said handle which is retained by said hook when the carrier is in a stowed position and which, by pivoting said handle, is moved out of retention by said hook, and
d. means on said unit for retaining a tire intermediate said ends.

8. A carrier as described in Claim 7 wherein:
f. said upper and lower members each have a channel-shaped cross section; and
g. said lower member is narrower than and rests inside said upper member when said carrier is in a stowed position.

9. A carrier as described in Claim 7 including:
f. means connected to said upper member for moving said upper member longitudinally along said lower member with a minimum of friction.

10. A carrier as described in claim 7 wherein said handle includes:
f. a relatively short portion pivotally connected at one end to said other end of said unit; and
g. a relatively long portion integrally connected to the other end of said short portion, said cross pin being fixed to said handle near the junction of said short and long portions.

11. A spare tire carrier adapted for installation on the underside of a wheeled vehicle comprising:
a. a first elongated member extending, in stowed position, generally transversely of said vehicle including a straight central portion connected at one end to an upswept end portion;
b. means for connecting said first member at the other end of said central portion to said underside for generally horizontal and vertical pivoting of said first member;
c. a second elongated member slidably mounted on top of and aligned with said first member including a central straight portion longer than the diameter of a tire for said vehicle and connected at one end to an upswept end portion;
d. means on said central straight portion of said second member for retaining a tire;
e. means connected to the other end of said central straight portion of said second member and generally transverse thereof for slidably supporting said second member on said first member with minimum friction during relative movement therebetween;
f. a hook supported on the underside of said vehicle near the outer end of said upswept end portion of said first member; and
g. a handle pivotally connected to said first member including a cross pin fixed thereto and retained by said hook when said carrier is in a stowed position.

12. A spare tire carrier as described in claim 11 wherein said hook comprises:
h. a shank portion having a horizontal flange portion integral with its upper end;
i. a bolt fixed to the underside of said vehicle and extending through said horizontal flange portion; and
j. a nut on said bolt for holding said horizontal flange portion and adjusting its vertical position on the vehicle.

13. A spare tire carrier as described in claim 11 wherein said handle has a bend near one end, said cross pin being fixed transversely thereto at said bend and positioned to engage the outer end of said upswept end portion of said first member when the handle is in the up position.

14. A spare tire carrier as described in claim 11 including:
h. a slot in the end of the upswept end portion of said first member having an inner portion of uniform width which is slightly wider than said hook and an outer portion which diverges outwardly from said inner slot portion.

* * * * *